US007382994B2

(12) United States Patent
Ravitz

(10) Patent No.: US 7,382,994 B2
(45) Date of Patent: Jun. 3, 2008

(54) BACKGROUND ENERGY DENSITY CONTROL IN AN ELECTROPHOTOGRAPHIC DEVICE

(75) Inventor: Cary Patterson Ravitz, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 264 days.

(21) Appl. No.: 11/238,314

(22) Filed: Sep. 29, 2005

(65) Prior Publication Data

US 2007/0071469 A1 Mar. 29, 2007

(51) Int. Cl.

| | |
|---|---|
| ***G03G 15/043*** | (2006.01) |
| ***G03G 15/22*** | (2006.01) |
| ***G03G 13/04*** | (2006.01) |
| ***B41J 2/385*** | (2006.01) |
| ***G06F 15/00*** | (2006.01) |
| ***G06K 1/00*** | (2006.01) |

(52) U.S. Cl. ......................... 399/51; 347/129; 358/1.9; 399/130

(58) Field of Classification Search .................. 399/49, 399/50, 51, 55, 130; 358/1.9, 3.24; 347/129, 347/132, 135

See application file for complete search history.

(56) References Cited

U.S. PATENT DOCUMENTS

| | | | | |
|---|---|---|---|---|
| 4,460,909 | A | 7/1984 | Bassetti et al. | |
| 4,544,264 | A * | 10/1985 | Bassetti et al. | 347/129 |
| 5,128,698 | A | 7/1992 | Crawford et al. | |
| 5,832,333 | A | 11/1998 | Umeda et al. | |
| 6,177,948 | B1 * | 1/2001 | Estabrooks et al. | 347/129 |
| 6,181,438 | B1 * | 1/2001 | Bracco et al. | 358/1.9 |
| 6,285,385 | B1 * | 9/2001 | Owaki et al. | 347/132 |
| 6,333,755 | B1 | 12/2001 | Ehara et al. | |
| 6,448,989 | B1 | 9/2002 | Shimizu et al. | |
| 6,529,223 | B2 | 3/2003 | Ohwaki et al. | |
| 6,532,030 | B2 | 3/2003 | Okano et al. | |
| 6,538,678 | B2 | 3/2003 | Nakase et al. | |
| 6,686,943 | B2 | 2/2004 | Ishii et al. | |
| 2002/0075372 | A1 | 6/2002 | Nagumo et al. | |
| 2004/0190031 | A1 | 9/2004 | Fujita | |

* cited by examiner

*Primary Examiner*—Sandra L Brase
(74) *Attorney, Agent, or Firm*—Coats & Bennett, PLLC

(57) ABSTRACT

Control circuitry associated with an electrophotographic imaging device is adapted to manage bias levels of components in an image forming unit. A photoconductive surface is charged to a first bias level, a developer member is charged to a second bias level, and an imaging unit selectively discharges image feature locations on the photoconductive surface to a third bias level. In certain regions having a predetermined image feature density, the imaging unit may discharge an area in the vicinity of the image features to a fourth bias level that is between the first and third bias levels. The amount by which the imaging unit discharges the area in the vicinity of the image features changes as image feature density changes and as the difference between the first and third bias levels change.

20 Claims, 6 Drawing Sheets

BACKGROUND ENERGY DENSITY CONTROL IN AN ELECTROPHOTOGRAPHIC DEVICE

BACKGROUND

The electrophotography process used in some imaging devices, such as laser printers and copiers, utilizes electrical potentials between components to control the transfer and placement of toner. These electrical potentials create attractive and repulsive forces that tend to promote the transfer of charged toner to desired areas while ideally preventing transfer of the toner to unwanted areas. For instance, during the process of developing a latent image on a photoconductive surface, charged toner particles may be deposited onto latent image features (e.g., corresponding to text or graphics) on the photoconductive surface having a lower surface potential than the charged particles. At the same time, the charged toner particles may be prevented from transferring or migrating to more highly charged areas (e.g., corresponding to the document background) of the same photoconductive surface. In this manner, imaging devices implementing this process may simultaneously generate images with fine detail while maintaining clean backgrounds.

The precise magnitudes of these electrical potentials and the nature of the voltages (e.g., AC or DC) varies among devices and manufacturers. In general, however, a laser or imaging source is used to illuminate and selectively discharge portions of a photoconductive surface to create a latent image having a lower surface potential than the remaining, undischarged areas of the photoconductive surface. The toner is charged to some intermediate level between the discharge potential of the latent image and the surface potential of the undischarged photoconductive surface. The toner may be charged triboelectrically and/or via biased toner delivery control components, such as a toner adder roll, a doctor blade, and a developer roller. The developer roller supplies toner to develop the latent images on the photoconductive surface. The developed image is ultimately transferred onto a media sheet, typically by employing yet another surface potential that attracts the toner off of the photoconductive surface (or an intermediate transfer surface) and onto the media sheet where it is ultimately fused.

The various surface potentials may be optimized to strike a balance between maintaining clear backgrounds while producing quality images with fine detail. For example, the surface potential of a developer roller may be optimized to develop images with a desired toner density. Another variable termed a "white vector" may be optimized as well. White vector refers to the difference between the surface potential of the developer roller and the surface potential of undischarged portions of a photoconductive surface. An optimal white vector achieves certain desirable characteristics, one of which is to provide a clean media sheet with little or no appreciable background toner in areas other than where printing is desired. Very large white vector values may adversely affect the density of deposited toner and detail of a resulting image. This problem may be more apparent with fine, isolated features where the illumination energy applied to form such features may be insufficient to discharge the photoconductive surface. Conversely, as white vector values fall, unwanted background may begin to appear.

In addition, image quality may be affected by imaging power. Imaging power affects the formation of the latent image on a photoconductive surface. For instance, a low imaging power may be insufficient to discharge the photoconductive surface, particularly with a large white vector. One method of overcoming this problem is to locally control the background energy density on the surface of the photoconductor, particularly in the vicinity of isolated features or isolated clusters of features. The background energy or charge on the photoconductive surface may be controlled on a global basis through some combination of white vector control and discharge via illumination. However, print density variations may call for local control over background energy. As a result, improved image production may be obtained through local modifications of background energy density on the basis of feature density.

SUMMARY

Embodiments of the present invention are directed to local control of photoconductive surface charge levels in the vicinity of image features having a predetermined image density. The embodiments are applicable in an image forming unit having a photoconductive unit, a charger unit to apply a charge to the surface of the photoconductive unit, an imaging unit forming one or more latent image features on the surface of the photoconductive unit, a developer member supplying toner to develop the latent image, and a controller to selectively control the various bias levels applied to these components.

A first charge is applied to bias the surface of the photoconductive unit to a first bias level. A window having multiple cells may be placed over image features and selected cells of the window may be discharged to modify the first bias level within the window to a second average bias level. The window may be centered over the image features. The individual cells of the window may be discharged by illuminating the cells with a first imaging power that is lower than a second imaging power that is used to illuminate the surface of the photoconductive unit to create a latent image of the image features. In one embodiment, cells in the window may be discharged upon identifying whether an image feature has a print density that is below a predetermined threshold. In general, more of the window cells may be discharged as the print density decreases. A third bias level may be established on a surface of a developer member, with the difference between the first and third bias levels termed a white vector value. More of the discrete cells may be discharged as the white vector value increases.

DETAILED DESCRIPTION

Figure 1:
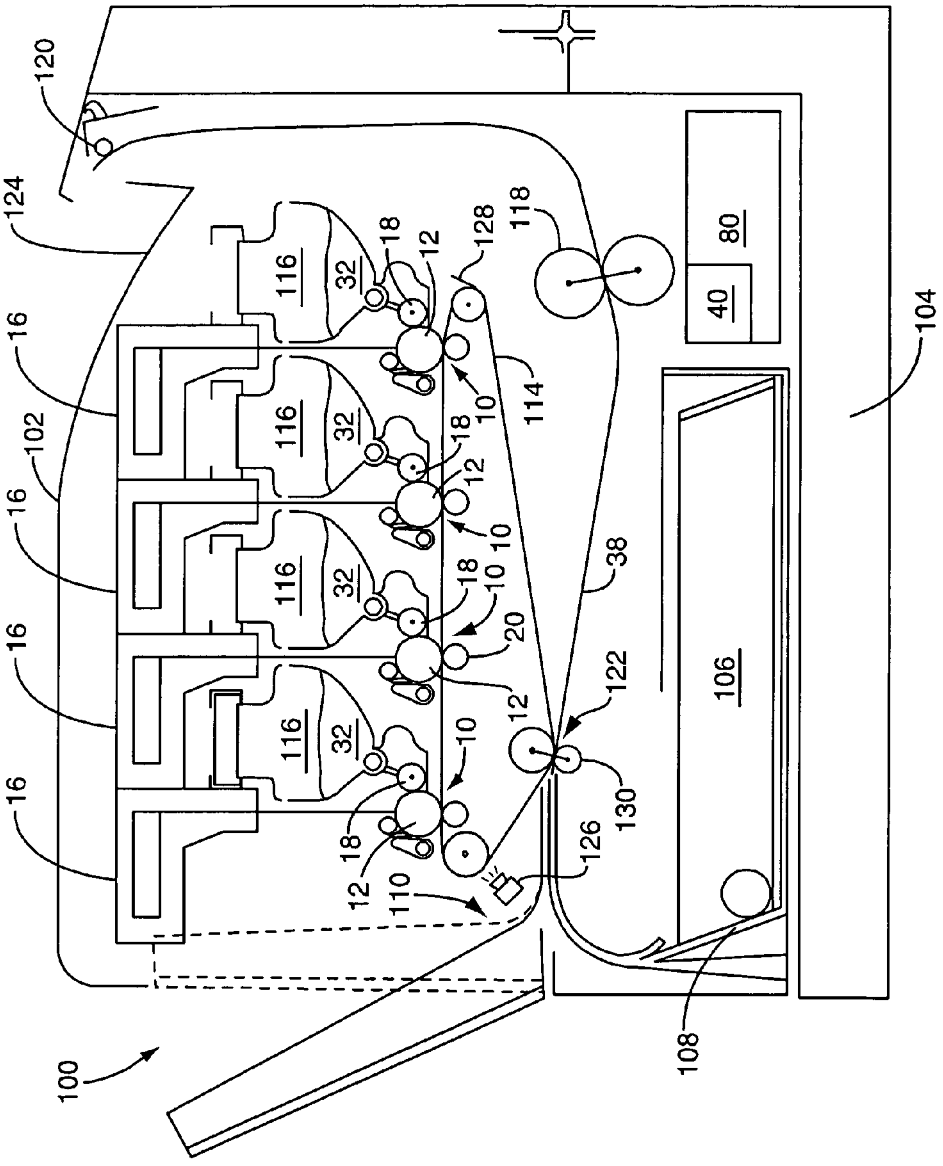
FIG. 1 is a functional block diagram of an image forming apparatus according to one embodiment.

In electrophotographic image development, certain operating points may be varied and optimized to produce high quality images with little or no background noise (i.e., toner particles not intended to be transferred to the media sheet). Even with various surface bias levels and imaging power level optimized, some additional improvement to fine features may be obtained through localized optimization of background energy density. Optimization of the background energy density in a device such as the image forming apparatus 100 generally illustrated in FIG. 1 may be achieved with various embodiments disclosed herein. The image forming device 100 comprises a housing 102 and a media tray 104. The media tray 104 includes a main stack of media sheets 106 and a sheet pick mechanism 108. The image forming device 100 also includes a multipurpose tray 110 for feeding envelopes, transparencies and the like. The media tray 104 may be removable for refilling, and located in a lower section of the device 100.

Within the image forming device housing 102, the image forming device 100 includes one or more removable developer cartridges 116, photoconductive units 12, developer rollers 18 and corresponding transfer rollers 20. The image forming device 100 also includes an intermediate transfer mechanism (ITM) belt 114, a fuser 118, and exit rollers 120, as well as various additional rollers, actuators, sensors, optics, and electronics (not shown) as are conventionally known in the image forming device arts, and which are not further explicated herein. Additionally, the image forming device 100 includes one or more system boards 80 comprising controllers (including controller 40 described below), microprocessors, DSPs, or other stored-program processors (not specifically shown in FIG. 1) and associated computer memory, data transfer circuits, and/or other peripherals (not shown) that provide overall control of the image formation process.

Each developer cartridge 116 may include a reservoir containing toner 32 and a developer roller 18, in addition to various rollers, paddles and other elements (not shown). Each developer roller 18 is adjacent to a corresponding photoconductive unit 12, with the developer roller 18 developing a latent image on the surface of the photoconductive unit 12 by supplying toner 32. In various alternative embodiments, the photoconductive unit 12 may be integrated into the developer cartridge 116, may be fixed in the image forming device housing 102, or may be disposed in a removable photoconductor cartridge (not shown). In a typical color image forming device, three or four colors of toner—cyan, yellow, magenta, and optionally black—are applied successively (and not necessarily in that order) to an ITM belt 114 or to a print media sheet 106 to create a color image. Correspondingly, FIG. 1 depicts four image forming units 10. In a monochrome printer, only one forming unit 10 may be present.

The operation of the image forming device 100 is conventionally known. Upon command from control electronics, a single media sheet 106 is "picked," or selected, from either the primary media tray 104 or the multipurpose tray 110 while the ITM belt 114 moves successively past the image forming units 10. As described above, at each photoconductive unit 12, a latent image is formed thereon by optical projection from the imaging device 16. In one embodiment, an imaging device 16 capable of producing an exposure level of about 1.1 micro-Joules per square centimeter at 100% power may be used. The latent image is developed by applying toner to the photoconductive unit 12 from the corresponding developer roller 18. The toner is subsequently deposited on the ITM belt 114 as it is conveyed past the photoconductive unit 12 by operation of a transfer voltage applied by the transfer roller 20. Each color is layered onto the ITM belt 114 to form a composite image, as the ITM belt 114 passes by each successive image forming unit 10. The media sheet 106 is fed to a secondary transfer nip 122 where the image is transferred from the ITM belt 114 to the media sheet 106 with the aid of transfer roller 130. The media sheet proceeds from the secondary transfer nip 122 along media path 38. The toner is thermally fused to the media sheet 106 by the fuser 118, and the sheet 106 then passes through exit rollers 120, to land facedown in the output stack 124 formed on the exterior of the image forming device housing 102. A cleaner unit 128 cleans residual toner from the surface of the ITM belt 114 prior to the next application of a toner image.

The representative image forming device 100 shown in FIG. 1 is referred to as a dual-transfer device because the developed images are transferred twice: first to the ITM belt 114 at the image forming units 10 and second to a media sheet 106 at the transfer nip 122. Other image forming devices implement a single-transfer mechanism where a media sheet 106 is transported by a transport belt (not shown) past each image forming unit 10 for direct transfer of toner images onto the media sheet 106. For either type of image forming device, there may be one or more toner patch sensors 126, to monitor a media sheet 106, an ITM belt 114, a photoconductive unit 12, or a transport belt (not shown), as appropriate, to sense various test patterns printed by the various image forming units 10 in an image forming device 100. The toner patch sensors 126 may be used for, among other purposes, registering the various color planes printed by the image forming units 10. In one embodiment, two toner patch sensors 126 may be used, with one at opposite sides of the scan direction (i.e., transverse to the direction of substrate travel).

Figure 2:
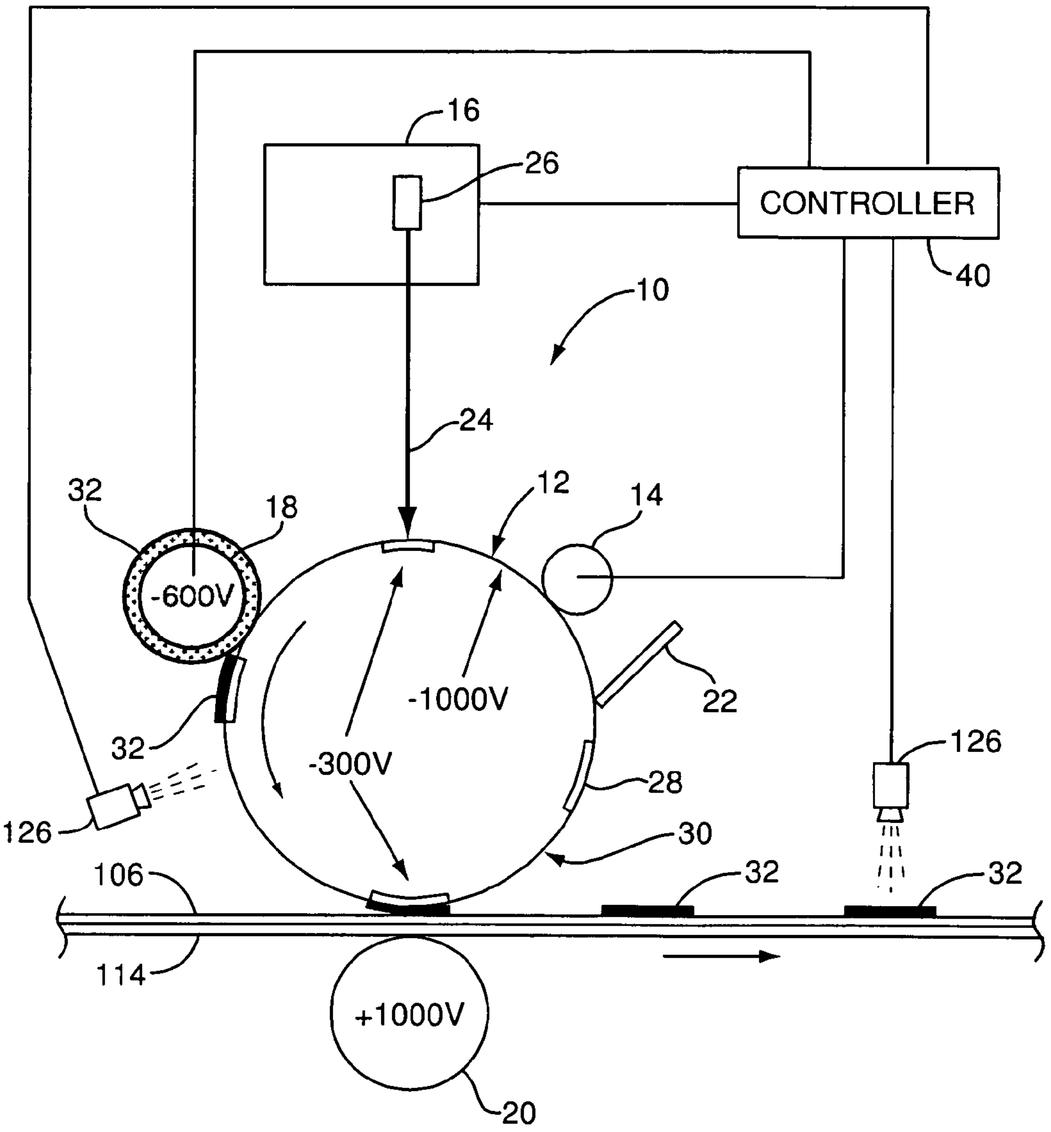
FIG. 2 is a schematic diagram of an image forming unit and a bias level controller according to one embodiment.

FIG. 2 is a schematic diagram illustrating an exemplary image forming unit 10. Each image forming unit 10 includes a photoconductive unit 12, a charging unit 14, an imaging device 16, a developer roller 18, a transfer device 20, and a cleaning blade 22. In the embodiment depicted, the photoconductive unit 12 is cylindrically shaped and illustrated in cross section. However, it will be apparent to those skilled in the art that the photoconductive unit 12 may comprise any appropriate shape or structure, including but not limited to belts or plates. The charging unit 14 charges the surface of the photoconductive unit 12 to a uniform potential, approximately −1000 volts in the embodiment depicted. A laser beam 24 from a laser source 26, such as a laser diode, in the imaging device 16 selectively discharges discrete areas 28 on the photoconductive unit 12 to form a latent image on the surface of the photoconductive unit 12. The energy of the laser beam 24 selectively discharges these discrete areas 28 of the surface of the photoconductive unit 12 to a potential of approximately −300 volts in the embodiment depicted (approximately −100 volts over a photoconductive unit 12 core voltage of −200 volts in this particular embodiment). Areas of the latent image not to be developed by toner (also referred to herein as "white" or "background" image areas) are indicated generally by the numeral 30 and retain the potential induced by the charging unit 14, e.g., approximately −1000 volts in the embodiment depicted.

The latent image thus formed on the photoconductive unit 12 is then developed with toner from the developer roller 18, on which is adhered a thin layer of toner 32. The developer roller 18 is biased to a potential that is intermediate to the surface potential of the discharged latent image areas 28 and the undischarged areas not to be developed 30. In the embodiment depicted, the developer roller 18 is biased to a potential of approximately −600 volts. Negatively charged toner 32 is attracted to the more-positive discharged areas 28 on the surface of the photoconductive unit 12 (i.e., −300V vs. −600V). The toner 32 is repelled from the less-positive, non-discharged areas 30, or white image areas, on the surface of the photoconductive unit 12 (i.e., −1000V vs. −600V), and consequently, the toner 32 does not adhere to these areas. As is well known in the art, the photoconductive unit 12, developer roller 18 and toner 32 may be charged alternatively to positive voltages.

In this manner, the latent image on the photoconductive unit 12 is developed by toner 32, which is subsequently transferred to a media sheet 106 by the positive voltage of the transfer device 20, approximately +1000V in the embodiment depicted. Alternatively, the toner 32 developing an image on the photoconductive unit 12 may be transferred to an ITM belt 114 and subsequently transferred to a media sheet 106 at a second transfer location (not shown in FIG. 2, but see location 122 in FIG. 1). After the developed image is transferred off the photoconductive unit 12, the cleaning blade 22 removes any remaining toner from the photoconductive unit 12, and the photoconductive unit 12 is again charged to a uniform level by the charging device 14.

The above description relates to an exemplary image forming unit 10. In any given application, the precise arrangement of components, voltages, power levels and the like may vary as desired or required. As is known in the art, an electrophotographic image forming device may include a single image forming unit 10 (generally developing images with black toner), or may include a plurality of image forming units 10, each developing halftone images on a different color plane with a different color of toner (generally yellow, cyan and magenta, and optionally also black).

The difference in potential between non-discharged areas 30 on the surface of the photoconductive unit 12—that is, white image areas or areas not to be developed by toner—and the surface potential of the developer roller 18 is known as the "white vector." This potential difference (with the white image areas 30 on the surface of the photoconductive unit 12 being less positive than the surface of the developer roller 18 in the embodiment depicted) provides an electrostatic barrier to the development of negatively charged toner 32 on the white image areas 30 of the latent image on the photoconductive unit 12. A sufficiently high white vector is necessary to prevent toner development in white image areas; however, an overly large white vector detrimentally affects the formation of fine image features, such as small dots and lines. In exemplary embodiments of image forming devices, a white vector as low as 200-250V may result in acceptable image quality while preventing toner development in white image areas. Unfortunately, the optimal white vector for each image forming unit 10 within an image forming device may be different, due to environmental conditions, differing toner formulations, component variation, difference in age or past usage levels of various components, and the like. Controller 40, via sensor 126, monitors toner 32 formation on media sheet 106 or belt 114 and adjusts the surface potential of the surface of photoconductive unit 12 (via charging device 14) and the surface potential of developer roller 18. Thus, while exemplary voltages establishing a white vector of 400V (i.e., |−1000V−−600V|) are explicitly shown in FIG. 2, actual operating voltages may be adjusted from these exemplary voltages by controller 40 to account for varying conditions. Furthermore, the controller 40 may also control the amount of power used by the imaging device 16 to develop latent images on the surface of the photoconductive unit 12.

In an exemplary embodiment, controller 40 at least partially manages the formation of a predetermined pattern of toner 32 on a substrate, which may comprise a media sheet 106 or belt 114 (e.g., a transfer or ITM belt). A toner patch sensor 126 detects a reflectivity of the transferred pattern and controller 40 adjusts the bias voltage of the charging device 14 and/or developer roller 18 as needed to optimize image formation at least partly based on information provided by the toner patch sensor 126. The controller 40 may adjust the developer 18 bias accordingly to achieve a target reflectivity.

With the developer roller 18 bias established relative to the discharge bias of latent images 28 on the surface of the photoconductive unit 12, the white vector may now be determined relative to the developer roller 18 bias. That is, in this exemplary embodiment, the white vector is established by adjusting the charging device 14 bias level while maintaining a fixed developer roller 18 bias. A detailed description of various methods of optimizing white vector in an electrophotographic image forming device is provided in commonly assigned U.S. patent application Ser. No. 11/126,814 entitled "White Vector Feedback Adjustment" filed May 11, 2005, the relevant portions of which are incorporated herein by reference.

The white vector establishes the surface bias that is applied to the surface of photoconductive unit 12. This surface potential is discharged through illumination by an imaging device 16 to create a latent image that is subsequently developed. In certain instances, the white vector may be set relatively high (thus increasing the surface bias applied to the photoconductive unit 12) to prevent unwanted background toner. Unfortunately, the relatively high surface bias applied to the photoconductive unit 12 makes it difficult to effectively discharge the photoconductive surface by illumination thereof. This situation is particularly problematic for fine and/or isolated image features.

Figure 3A:
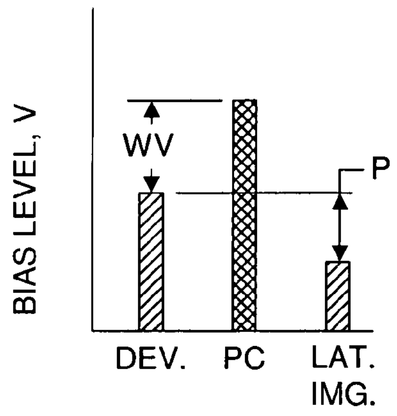
FIGS. 3A-3D are graphical representations of the relationship between the bias levels applied to a developer member, a photoconductive surface, and a latent image according to one embodiment.

FIG. 3A shows a graphical representation of the exemplary bias levels shown in FIG. 2. Specifically, FIG. 3A shows the bias levels applied to the surface of the developer roller 18 (indicated as "Dev."), to the surface of the photoconductive unit 12 (indicated as "PC"), and the discharge bias of latent image features 28 (indicated as "Lat. Img.") produced by illumination from the imaging device 16. White vector (WV) is shown as the difference in bias between the developer roller 18 and the surface of the photoconductive unit 12. Notably, FIG. 3A shows that the latent image 28 bias is well below the developer roller 18 bias, with the difference indicated as a potential P. This potential P represents the attractive force that causes toner to transfer from the developer roller 18 to the latent image 28, thereby developing the image. Thus, for most image features, this difference in bias P between the latent image 28 and the developer roller 18 may suffice to produce quality images.

Figure 3B:
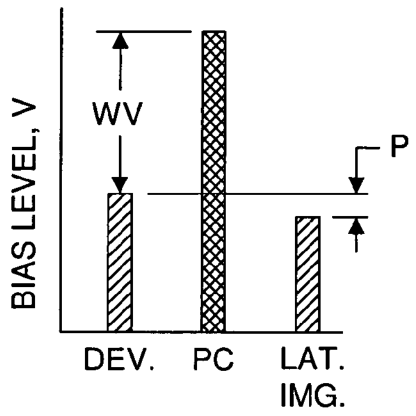

In contrast, FIG. 3B shows the bias levels for the same components, but with a larger white vector WV. This situation may be necessary to prevent background toner from appearing in areas intended to be free from toner. Further, in this scenario, the same or similar imaging power is used to create the latent image features 28 on the surface of the photoconductive unit 12. As a result of the higher surface potential on the photoconductive unit 12, the latent image 28 features have a bias level that approaches the bias level of the developer roller 18. Thus, this difference in bias P between the latent image 28 and the developer roller 18 may not be sufficient to transfer toner from the developer roller 18 to the latent image 28 and develop the image.

Figure 3C:
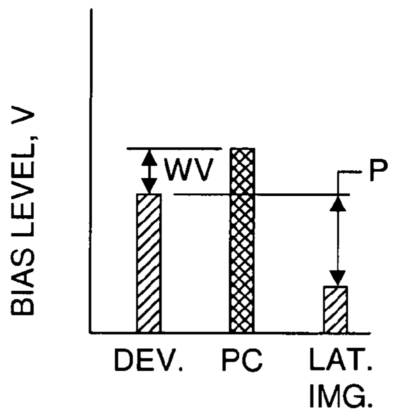

FIG. 3C shows the bias levels for the same components, but with a smaller white vector WV than is illustrated in FIGS. 3A and 3B. This situation may be desirable as long as the white vector WV is sufficient to prevent background toner from appearing in areas intended to be free from toner. An advantage of this scenario is that the difference in bias P between the latent image 28 and the developer roller 18 is larger than that shown in FIGS. 3A and 3B. That is, the bias difference P may be sufficient to transfer toner from the developer roller 18 to the latent image 28 and develop very fine image features. Unfortunately, it is also possible for the bias difference P to become so large that "normal" features (i.e., features that are not very small or very isolated) are developed with too much toner.

Accordingly, there may be an optimal white vector WV value that prevents background toner while creating quality images in most situations. A problem arises when the image forming unit 100 is tasked with reproducing very fine details or very isolated details. These types of features are often characterized in that a small amount of toner is desired in an area that is otherwise free from toner. This situation may be represented by the bias levels shown in FIG. 3D. One may assume that the WV value is optimized in this scenario. In fact, the WV value may be similar to the value shown in FIGS. 2 and 3A, however actual values may vary widely depending on environmental conditions, differing toner formulations, component variation, difference in age or past usage levels of various components, and the like.

Figure 3D:
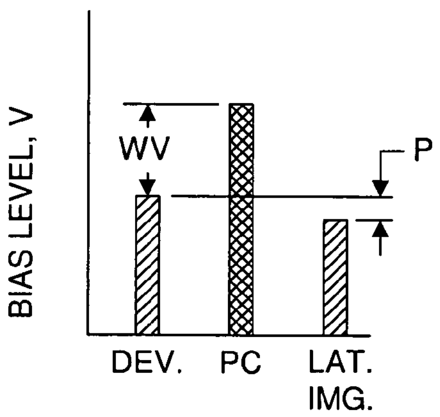

Even with white vector WV optimized for given conditions, and imaging power optimized to produce quality latent images in most situations, there may still be problems reproducing fine or isolated details. This may be due, in part, to the fact that a relatively small amount of optical energy is used to create latent images 28 of these features. As a result, the latent image 28 of fine and isolated features may not be fully discharged. This is represented in FIG. 3D by the relatively small difference in bias P between the latent image 28 and the developer roller 18. This problem may be solved by reducing white vector WV so that the latent image features 28 are discharged to a bias level that is sufficiently lower than that of the developer roller 18. However, as indicated above, white vector WV may be bounded at the low end by the desire to prevent background toner.

Reviewing the different scenarios illustrated in FIGS. 3A-3D, one solution to the above described problems uses the imaging device 16 to reduce white vector WV to some intermediate value in the vicinity of latent image features. This approach selectively discharges portions of the surface of the photoconductive unit 12. Thus, background areas are maintained at the surface potential established by the charging unit 14. Image features are then formed by illuminating the slightly discharged areas to ensure the latent image 28 potential is sufficiently below the developer roller 18 bias. A detailed description of various methods of adjusting white vector in this manner within an electrophotographic image forming device is provided in commonly assigned U.S. patent application Ser. No. 11/006,175 entitled "White Vector Adjustment Via Exposure" filed Dec. 7, 2004, the relevant portions of which are incorporated herein by reference.

Figure 4A:
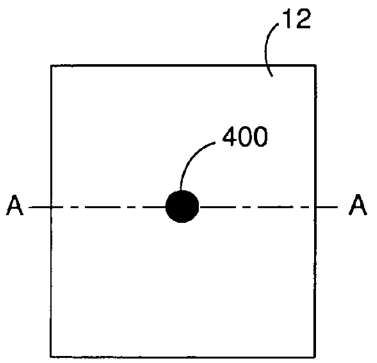
FIGS. 4A-4C are graphical representations of the relationship between the bias levels applied to a developer member, a photoconductive surface, and a latent image in the vicinity of an isolated image feature according to one embodiment.
Figure 4B:
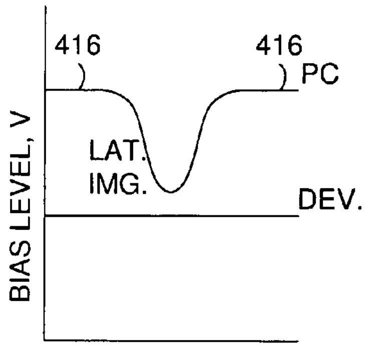

A further enhancement of the image formation process considers the density of toner features that are being reproduced. The schematic illustrations provided in FIGS. 4A-4C and 5A-5C qualitatively demonstrate the effect feature density has on image formation. FIG. 4A shows an isolated feature, such as an isolated single pel dot 400, that is formed on the surface of the photoconductive unit 12. In the present example, a dot 400 is shown, but the effects are generally similar for other isolated features, including lines. FIG. 4B shows a graphical representation of the bias levels along line A-A in FIG. 4A. The uppermost line 416 represents the surface bias applied to the surface of the photoconductive unit 12. Similar to FIGS. 3A-3D, this bias is labeled PC. Also similar to FIGS. 3A-3D, the developer roller 18 bias is labeled DEV. The portion of the upper curve labeled LAT. IMG. represents the discharged portion of the surface of the photoconductive unit 12 that has been illuminated by imaging unit 16 to create the isolated dot 400.

In general, the illumination power from the imaging unit 16 may be distributed as a Gaussian curve with a peak at the center of the incident energy and tails on either side. While two dimensions are represented in FIGS. 4B-4C and 5B-5C, the illumination energy may be generally distributed in all directions around the center of the image feature 400. As suggested above, the illumination energy from the imaging device 16 used to create small, isolated features may not be sufficient to discharge the surface of the photoconductive unit 12 below the surface bias of the developer roller 18 by an amount to accurately reproduce the image feature. This is represented in FIG. 4B by the fact that the exemplary bias level for the latent image feature LAT. IMG. is above that of the developer roller 18. In other scenarios, the bias level for the latent image feature LAT. IMG. may fall below that of the developer roller 18, but not by an amount to attract a sufficient quantity of toner from the developer roller 18 to the latent image feature 400.

Figure 4C:
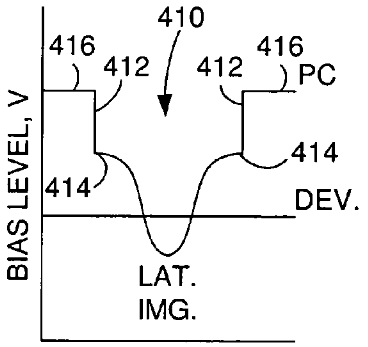

Therefore, in one embodiment, the localized background energy density may be altered as shown in FIG. 4C. As used herein, the term "background energy density" may refer to the distributed charge level of the background area surrounding a feature of interest. In FIG. 4C, the background energy density is referred to generally by the number 410 and represents the charge level of the surface of the photoconductive unit 12 relative to the charge level established by charging unit 14. The background energy density 410 may also be described relative to the amount of illumination energy used to discharge an area surrounding a feature of interest. Various techniques for locally discharging the surface of the photoconductive unit 12 are discussed in greater detail below.

FIG. 4C shows that the bias level on the surface of the photoconductive unit 12 is locally discharged as evidenced by a drop 412 in bias level in the region surrounding the isolated image feature 400. This local drop 412 in bias level may be generated through illumination from the imaging device 16. This local drop 412 in bias level lowers the bias level on the surface of the photoconductive unit 12 to an intermediate level 414 that is below the charge level 416 established by charging unit 14 but above the developer roller 18 bias. It should be noted that while a step function drop 412 in bias level is shown in FIG. 4C, the Gaussian nature of the illumination energy may produce a more tapered transition. The step function drop 412 is shown for illustration purposes only. As the image feature 400 is formed by further illumination, the surface of the photoconductive unit 12 is discharged from the intermediate level 414 so that the bias level of the latent image 28 reaches a level that attracts a sufficient quantity of toner from the developer roller 18 to the latent image feature 400.

Figure 5A:
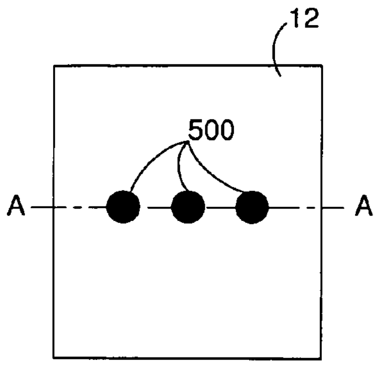
FIGS. 5A-5C are graphical representations of the relationship between the bias levels applied to a developer member, a photoconductive surface, and a latent image in the vicinity of a cluster of image features according to one embodiment.
Figure 5B:
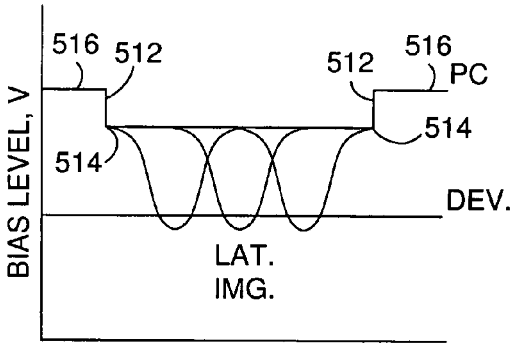
Figure 5C:
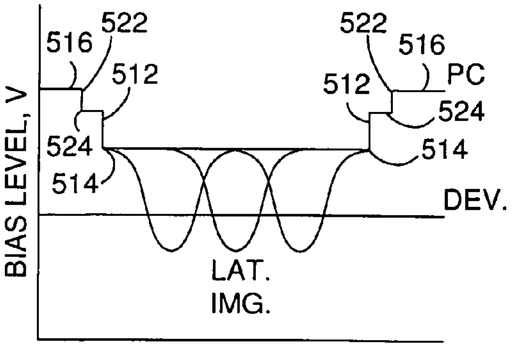

FIGS. 4A-4C illustrate one example of a modification to the background energy density 410 to properly develop a small, isolated feature. It should be noted that the intermediate level 414 may be adjusted relative to the charge level 416 established by charging unit 14 depending on the density of toner features. For instance, FIGS. 5A-5C illustrate one example of a modification to the background energy density 410 to properly develop a cluster of small, isolated features 500. FIG. 5B shows a graphical representation of the bias levels along line A-A in FIG. 5A. As described above, the uppermost line 516 represents the surface bias applied to the surface of the photoconductive unit 12 by charging unit 14. The developer roller 18 bias is labeled DEV. The curves labeled LAT. IMG. represent the discharged portions of the surface of the photoconductive unit 12 that have been illuminated by imaging unit 16 to create the isolated dots 500.

FIG. 5B further illustrates a localized drop 512 in bias level in the region surrounding the isolated image feature 500. However, unlike the drop 412 illustrated in FIGS. 4B-4C, this particular drop 512 is a function of the illumination energy used to create the image features 500 themselves. As discussed above, the illumination energy used to create the latent images is distributed, perhaps even Gaussian in nature. Therefore, when there are multiple image features in close proximity to one another, there may be some overlap of the energy used to discharge the surface of the photoconductive unit 12. The result is that the background energy density, indicated generally by the number 510, is naturally modified by the existence of a cluster of image features 500. That is, the local drop 512 in bias level lowers the bias level on the surface of the photoconductive unit 12 to an intermediate level 514 that is below the charge level 516 established by charging unit 14.

This natural drop 512 in photoconductor surface bias may improve image quality by lowering the latent image 28 bias levels. However, if the image features 500 are still somewhat sparse, some improvement may be gained by inducing a second bias drop 522 in the region surrounding the isolated image features 500. As above, this second bias drop 522 may be generated through illumination from the imaging device 16 and lowers the bias level on the surface of the photoconductive unit 12 to an intermediate level 524 that is below the charge level 516 established by charging unit 14. In the present example, the second bias drop 522 induced for a small cluster of features 500 may be less than the bias drop 412 induced for a single isolated feature 400. Similarly, other modifications to the background energy density 410, 510 may be induced in relation to the density of printed features.

Figure 6:
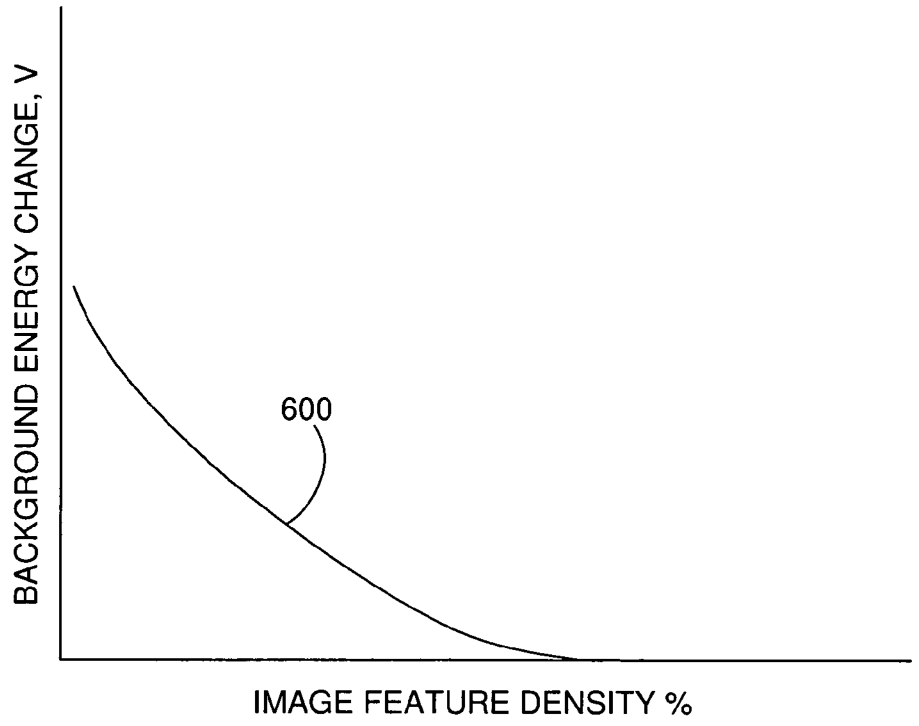
FIG. 6 is a graphical representation of the relationship between background energy density change and image feature density according to one embodiment.

FIG. 6 shows one embodiment of an operating curve 600 defining a relationship between the amount of modification to background energy density relative to image feature density. As the examples illustrated in FIGS. 4A-4C and 5A-5C demonstrated, a greater modification to the background energy density may be necessary for image features that are small and isolated. By the same token, less modification to the background energy density may be necessary for image features that are larger and closer together. In the absence of image features, no modification to the background energy density is required. These conditions are illustrated by the operating curve 600 shown in FIG. 6. Once an operating curve 600 such as this is created, the data points represented by the operating curve 600 may be stored in system memory as a look up table accessible by controller 40 or as a best-fit equation executable by controller 40 to modify the background energy density based upon a known print density.

Figure 7:
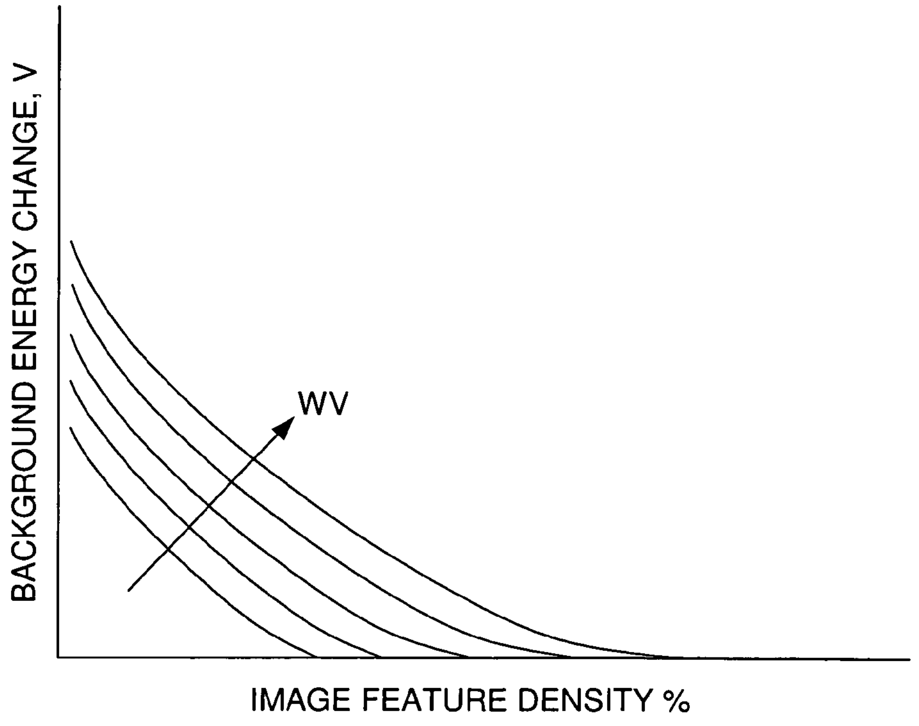
FIG. 7 is a graphical representation of the relationship between background energy density change and image feature density over a range of white vector values according to one embodiment.

It should be noted that the examples provided in FIGS. 4A-4C, 5A-5C and 6 are based upon a single white vector WV value. In actuality, the white vector WV may vary greatly depending on environmental conditions, differing toner formulations, component variation, difference in age or past usage levels of various components, and the like. Accordingly, a plurality of curves may be generated to give a desired background energy density as a function of print density for a range of white vector values. Examples of such curves are illustrated in FIG. 7, where the arrow labeled WV represent a direction of increasing white vector. In general, a greater modification to the background energy density may be necessary for larger white vector values. This is due, in part, to the fact that a larger white vector infers a larger bias level applied to the surface of the photoconductive unit 12 (relative to the developer roller 18). Thus, with larger white vector values, a greater amount of energy is required to discharge the surface of the photoconductor unit 12 to create a latent image that attracts toner from the developer roller 18. Notably, the operating curves illustrated in FIGS. 6 and 7 tend towards zero modification to the background energy density at some value less than 100% printed feature density. This is due, in part, to the natural discharging effect that is produced by large features and clusters of features. The embodiments disclosed herein may be employed to locally discharge the surface of the photoconductive unit 12 in the vicinity of isolated image features according to these operating curves.

Figure 8:
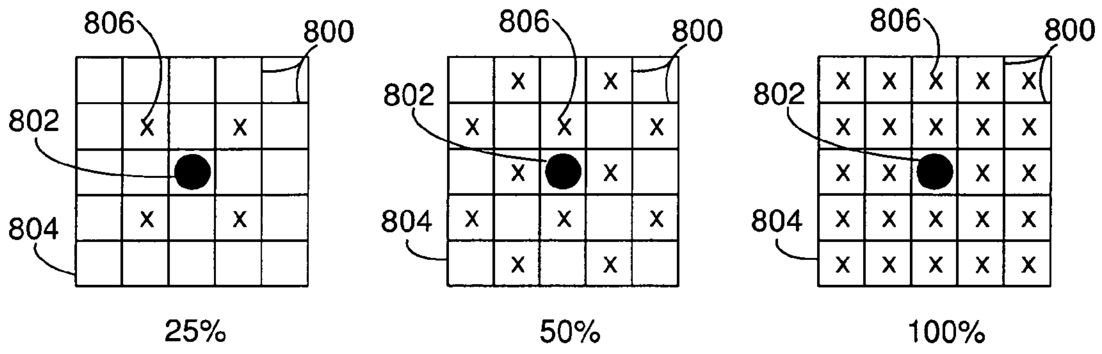
FIG. 8 is a graphical set depicting various background energy density modifications using a grid placed over an image feature according to one embodiment.

FIG. 8 depicts one method of modifying the background energy density in the vicinity of a printed feature. A high frequency screen 800 may be used to apply distributed illumination energy to locally discharge the surface of the photoconductive unit 12 in the vicinity of an isolated feature 802. In one embodiment, a 5×5 window 804 may be located over a printed feature of interest 802. In one embodiment, this window 804 is centered over the printed feature of interest 802. In another embodiment, the printed feature of interest may be located at other positions within the window 804.

Illumination energy may be applied to discrete positions 806 in the window 804 in a manner that is analogous to halftoning of grayscale images. With respect to image reproduction, halftoning may produce a picture in which gradations of light are perceived as a result of the relative darkness and density of dots produced in varying numbers within a fine screen area. With regards to the present embodiment, halftoning may produce a desired background energy density by varying the number of illuminated dots in the window 804. For instance, FIG. 8 shows three exemplary scenarios where approximately 25%, 50%, and 100% of the cells in the 5×5 window 804 are illuminated by the imaging device 16. These percentages may correlate with the vertical axis in FIGS. 6 and 7. That is, where a greater modification to the background energy density is indicated, higher halftone percentages may be used to discharge the area around a feature of interest 802. As indicated above, the exemplary operating point curves in FIGS. 6 and 7 establish a relationship between a change in background energy density and image feature density. Consequently, higher halftone percentages may be used to discharge discrete areas 806 in the vicinity of a feature of interest 802 when image feature density is low. Conversely, lower halftone percentages may be used to discharge discrete areas 806 in the area around a feature of interest 802 when image feature density is high. Further, this latter relationship may be bounded at an upper end of the image feature density where little or no modification to the background energy density may be required above a predetermined threshold.

Figure 9:
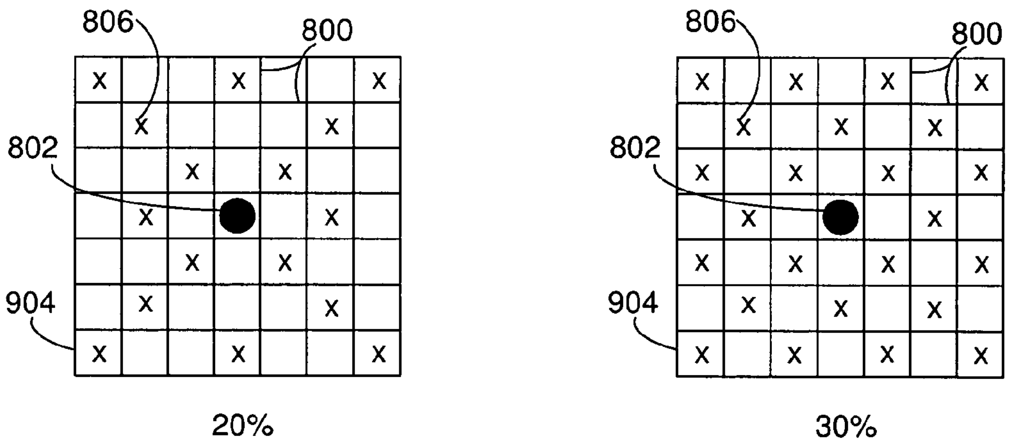
FIG. 9 is a graphical set depicting various background energy density modifications using a grid placed over an image feature according to one embodiment.

In one embodiment, the illumination energy applied to the discrete positions 806 in the window 804 may be some fraction of the illumination energy that is used to illuminate the feature of interest 802. For example, if full imaging power is applied to illuminate the feature of interest 802, then some intermediate imaging power (between on and off) may be applied at the discrete positions 806. As another example, if an imaging power that is 50% of the capacity of the imaging device 16 is used to illuminate the feature of interest 802, then some value between 5% and 45% may be used to illuminate the discrete positions 806. The energy used to illuminate the discrete positions 806 should not be so large as to create false latent image features that attract toner from the developer roller 18. Thus, lower illumination energy values may be appropriate. The total energy density of the area within the window 804 can be calculated as an average of the off background cells, the illuminated discrete positions 806, and the energy produced by illumination of the feature of interest 802. Alternatively, the energy density of the area within the window 804 may be calculated as a distance-weighted average of the illuminated discrete positions 806. In one embodiment, illuminated discrete positions 806 that are closer to the feature of interest 802 are assigned a greater weight. A greater modification to the background energy density is produced as more discrete positions 806 are illuminated. The size of the window 804 may be changed depending on the resolution of the image, the resolution of the imaging device, and the printing halftone screen frequencies. For instance, a 9×9 window 904 as shown in FIG. 9 may be appropriate for a 600 dpi print resolution.

Those skilled in the art should appreciate that the illustrated controller 40 shown in FIG. 2 for implementing the present invention may comprise hardware, software, or any combination thereof. For example, circuitry for controlling the imaging device 16 to modify background energy density may be a separate hardware circuit, or may be included as part of other processing hardware. More advantageously, however, the controller 40 circuitry is at least partially implemented via stored program instructions for execution by one or more microprocessors, Digital Signal Processors (DSPs), ASICs or other digital processing circuits included in the image forming device 10. In other embodiments, some or all of the processing steps executed to modify background energy density may be performed in a host computer or other connected computing system. In one embodiment, the local area analysis required to induce the modified background energy density may be performed during the rasterization process.

Further, those skilled in the art of electrophotographic illumination should comprehend that application of the different illumination energy levels may be performed through pulse-width modulating the current to the imaging device 16. Pulse-width modulation is a technique well known in the art whereby the total current supplied to a load is controlled by altering the duration of time during each of a series of repetitive periods in which current is driven. In other words, by controlling the "duty cycle" of periodically driving current to the load, the net current received by the load may be precisely controlled. Pulse-width modulation may find particular utility in applications where the controller 40 is digital. In another embodiment of the present invention, the current received by the imaging device 16 is the sum of separate current sources. In another embodiment, the current received by the imaging device is controlled by a binary control string that establishes the current generated by a digital high voltage power supply.

The present invention may be carried out in other specific ways than those herein set forth without departing from the scope and essential characteristics of the invention. For example, the halftoning approach described above contemplated applying a lowered illumination energy at discrete points 806 in a window surrounding a feature of interest 802. In other embodiments, varying illumination energies may be applied at discrete points 806 in the window 804, 904. For instance, a larger illumination energy may be applied at discrete points 806 that are closer to or farther from the feature of interest 802. The present embodiments are, therefore, to be considered in all respects as illustrative and not restrictive, and all changes coming within the meaning and equivalency range of the appended claims are intended to be embraced therein.

What is claimed is:

1. A method of adjusting a surface potential of a photoconductive unit relative to an associated developer roller in an image forming device, the method comprising:

uniformly charging the surface of said photoconductive unit to a first bias level;

selectively illuminating the surface of said photoconductive unit to a second bias level at predetermined locations to be developed by toner;

biasing the surface of said developer roller to a third bias level intermediate to said first and second bias levels;

overlaying a window having discrete window positions over the predetermined locations; and illuminating selected ones of the discrete window positions thereby producing a fourth bias level, said fourth bias level intermediate to said first and third bias levels.

2. The method of claim 1 further comprising illuminating the discrete window positions with a first imaging power that is lower than a second imaging power that is used to illuminate the surface of the photoconductive unit at the predetermined locations.

3. The method of claim 1 further comprising discharging more of the discrete window positions as a density of the predetermined locations decreases.

4. The method of claim 1 further comprising discharging more of the discrete window positions as a difference between the first and third bias levels increases.

5. The method of claim 1 further comprising illuminating selected ones of the discrete window positions only if a density of the predetermined locations falls below a predetermined threshold.

6. The method of claim 1 where overlaying a window having discrete positions over the predetermined locations comprises centering the window over the predetermined locations.

7. The method of claim 1 wherein the fourth bias level is determined as an average bias level over the entire window comprising a resulting charge level of illuminated and non-illuminated discrete window positions.

8. The method of claim 7 wherein the fourth bias level is determined as a distance weighted average of illuminated discrete window positions.

9. A method of adjusting a bias level on the surface of a photoconductive unit in an image forming device, the method comprising:

applying a first charge to bias the surface of the photoconductive unit, the first charge applied substantially uniformly to create a first bias level on the surface of the photoconductive unit;

identifying one or more image features having a print density that is below a predetermined threshold;

subdividing a window that is placed over each of the image features, the subdividing step creating a plurality of discrete cells in the vicinity of the image features;

discharging selected ones of the discrete cells to modify the first bias level within the window to a second average bias level; and creating a third bias level on a surface of a developer member, the third bias level being lower than the first bias level by a white vector value, and discharging more of the discrete cells as the white vector value increases.

10. The method of claim 9 wherein discharging selected ones of the discrete cells comprises illuminating the discrete cells.

11. The method of claim 10 further comprising illuminating the discrete cells with a first imaging power that is lower than a second imaging power that is used to illuminate the surface of the photoconductive unit to create a latent image of the image features.

12. The method of claim 9 further comprising discharging more of the discrete cells as the print density decreases.

13. The method of claim 12 wherein the predetermined threshold is approximately a 50% print density.

14. The method of claim 9 further comprising centering the window over the image features.

15. An electrophotographic image forming device comprising:

a photoconductive unit;

a charger unit to apply a charge to a surface of the photoconductive unit, the charge sufficient to bias the surface of the photoconductive unit to a first voltage;

an imaging unit forming one or more latent image features on the surface of the photoconductive unit by selectively discharging the surface of the photoconductive unit to a second voltage;

a developer roller having a surface biased to a third voltage, the developer roller supplying toner to develop the latent image features on the surface of the photoconductive unit; and a controller to selectively modify the charge on the surface of the photoconductive unit in the vicinity of the latent image features by controlling the image forming unit to discharge the surface of the photoconductive unit to a fourth voltage in response to a density of the latent image features.

16. The device of claim 15 wherein the imaging unit comprises an adjustable imaging power, the controller selectively modifying the charge on the surface of the photoconductive unit in the vicinity of the latent image features to the fourth voltage by controlling the image forming unit to discharge the surface of the photoconductive unit using a second imaging power that is lower than a first imaging power that is used to selectively discharge the surface of the photoconductive unit to the second voltage.

17. The device of claim 15 wherein the controller subdivides the surface of the photoconductive unit in the vicinity of the latent image features into a plurality of window cells and selectively modifies the charge on the surface of the photoconductive unit to the fourth voltage by controlling the image forming unit to discharge selected window cells.

18. The device of claim 17 wherein the controller controls the image forming unit to discharge more window cells as the density of the latent image features decreases.

19. The device of claim 17 wherein the controller keeps the image forming unit from discharging any window cells if the density of the latent image features exceeds a predetermined threshold.

20. The device of claim 17 wherein the controller controls the image forming unit to discharge more window cells as a difference between the first and third voltage levels increases.

* * * * *